Dec. 7, 1954 C. E. DRAKE 2,696,229
PLANER SAW
Filed Jan. 31, 1951

INVENTOR.
CLAUD E. DRAKE
BY Alfred W. Petchaft
ATTORNEY

United States Patent Office 2,696,229
Patented Dec. 7, 1954

2,696,229

PLANER SAW

Claud E. Drake, Brentwood, Mo.

Application January 31, 1951, Serial No. 208,813

2 Claims. (Cl. 143—140)

This invention relates in general to certain new and useful improvements in saws and cutters, such as saws and the like, and, more particularly, to carbide tipped circular cutters and saws.

It is the primary object of the present invention to provide a cutting tool of the type stated which will cut extremely smooth, clean kerfs which are extremely good for glue-jointing.

It is another object of the present invention to provide a toothed cutter or saw which is economical in construction and cost of operation and is capable of performing highly accurate work at a sustained rate and over a long period of time without shutdowns for repairs or re-sharpening.

It is also an object of the present invention to provide a cutting tool of the type stated which will produce cleanly sheared chips and will produce work of extremely close tolerance and smooth finish thereby eliminating the extra cost of subsequent finishing operations.

It is a further object of the present invention to provide a cutter of the type stated which is adapted to subdivide the cut and lessen or decrease the forces or stress to which each tooth is subjected at instant of impact and to prevent accumulation of gum deposits.

It is an additional object of my invention to provide a cutter of the type stated which utilizes a unique grouping of sets of cutting teeth of varied length and width.

With the above and other objects in view, my invention resides in the novel features of form, construction, arrangement, and combination of parts presently described and pointed out in the claims.

In the accompanying drawing—

Figure 2:
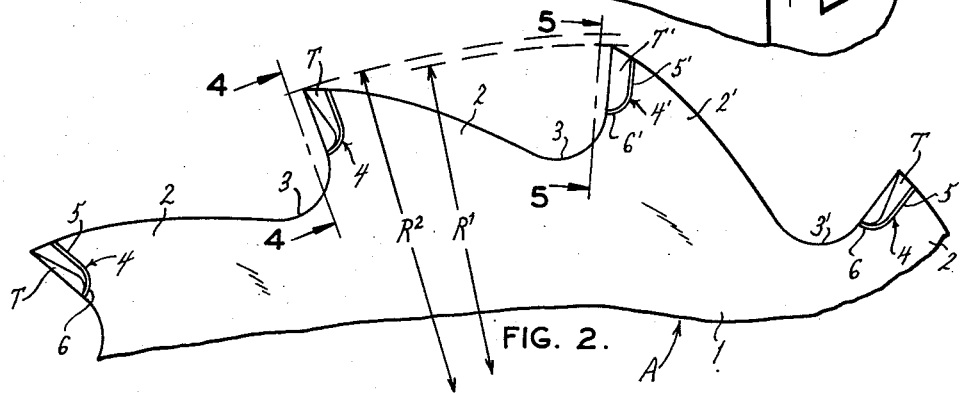
Figure 2 is a fragmentary side elevational view of a circular saw or cutter constructed in accordance with the present invention.
Figure 3:
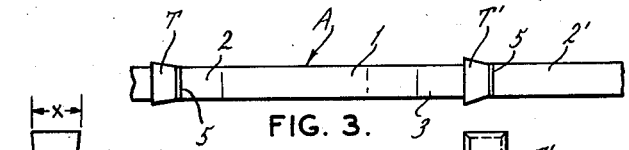
Figure 3 is a fragmentary top plan view of the circular cutter or saw.
Figure 4:
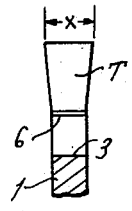
Figure 6:
Figure 5:
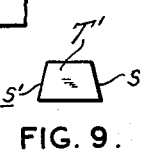
Figure 7:
Figure 8:
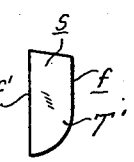
Figure 9:
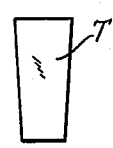
Figure 10:
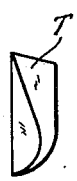
Figure 11:
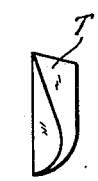

Figures 4 and 5 are fragmentary cross-sectional views of the saw taken, respectively, along the lines 4—4 and 5—5 of Figure 2;

Figures 6, 7, and 8 are top plan, front elevational, and side elevational views, respectively, of one form of carbide tip forming a part of the present invention; and Figures 9, 10, and 11 are top plan, front elevational, and side elevational views, respectively, of another form of carbide tip forming a part of the present invention.

Referring now in more detail and by reference characters to the drawing, which illustrate practical embodiments of the present invention, A designates a circular cutter or saw comprising a steel disk or plate 1, which may be of any suitable gauge, thickness, and diameter and which is formed of any conventional steel alloy ordinarily used for such purposes. The disk or plate 1 is provided around its periphery with a uniformly spaced annular series of teeth 2, 2', separated by gullets 3, 3'. The teeth 2, 2', are arranged in sets consisting of two or more teeth 2 and one tooth 2' in each set. Each tooth 2 is cut inwardly from its point in the provision of a two-sided recess 4 having a flat backing face 5 perpendicular to the side faces of the plate 1 and an arcuate bottom face 6, so that the backing face 5 may be said to be connected to the tooth-face by a "radius," as it is sometimes called. Similarly, each tooth 2' is cut away inwardly from its point in the provision of a two-sided recess 4' having a flat backing face 5' perpendicular to the side faces of the plate 1 and an arcuate bottom face 6'.

Provided for disposition in the recesses 4 of the teeth 2 are tungsten carbide or alloy tip members T, each of which, as shown in Figures 6, 7, and 8, is formed of compressed and sintered carbide or suitable dense cast alloys in the shape of an elongated prism having a transverse width along its each face substantially equal to the thickness of the plate 1 and having a radius equal to the radius of the bottom face 6 of the recess 4. On its forward or cutting face the tip T is wider than the thickness of the saw plate 1 and tapers inwardly and downwardly, as shown in Figures 6 and 7. The tip T is furthermore slightly wider and greater in length than the recess and is tightly and securely brazed or silver-soldered into the recess 4.

Similarly provided for disposition in the recesses 4' of the teeth 2' are carbide tip members T', each of which, as shown in Figures 9, 10, and 11, is formed of compressed and sintered tungsten carbide or dense cast alloy in the shape of a somewhat prism-shaped solid having a transverse side elevational shape, as shown in Figure 11, identical with the side elevational shape of the tip member T and being on its rear face $f$ substantially identical in shape and size to the backing face 5' of the recess 4'. On its forwardly or outwardly presented face $f'$, the tip member T is symmetrically widened, so that its side faces $s$, $s'$, will, in a manner of speaking, be uniformly outwardly beveled, all as best seen in Figure 9. The tip T' is also firmly brazed or silver-soldered into one of the recesses 4'.

The teeth 2, 2', are then ground so that the faces and lands of the tips T, T', are brought into smoothly curved conformity with the tooth pattern, as shown in Figure 2. Furthermore, the teeth 2 have positive rake whereas the teeth 2' have negative rake. It should be noted in this connection that the teeth 2 and 2' are respectively arranged in recurring or alternate sequence around the periphery of the cutter or saw A and that the teeth 2 are high teeth in the sense that the radial distance R' from the center of the plate 1 to the outermost point of the tip T', is substantially shorter than the radial distance $R^2$ from the center of the plate 1 to the outermost point of the tip T so that the tip T' will not do any cutting on its end face. It will also be noted that the low teeth 2' are also the wide teeth and may be referred to as the planing teeth whereas the high teeth 2 are narrow teeth. Actually, the width of the cutting edge of tip T' is approximately .002–.012 inch wider than the width $x$ of tip T, where $x$ is approximately .160 inch. The amount of difference in width, of course, will vary depending upon the gauge of the saw plate, the diameter, the number of teeth, and similar variables, but as a practical matter this width-difference should fall within the range of 1.5% to 7.5% of the width $x$ of the narrow tooth tip.

Figure 1:
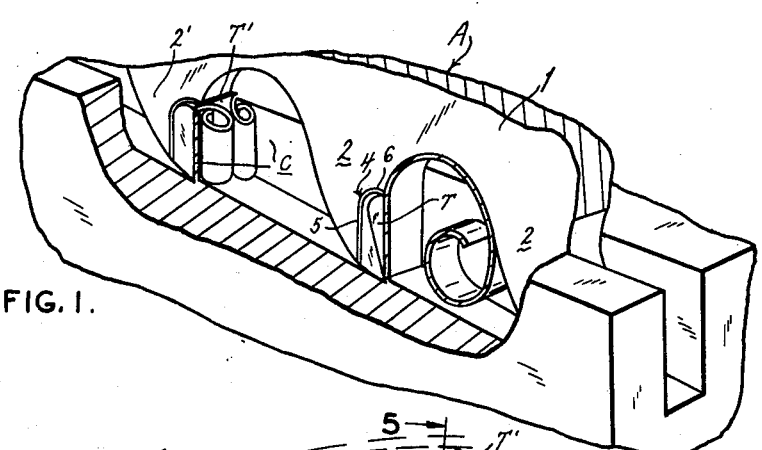
Figure 1 is a fragmentary perspective view, partly broken away and in section, of a saw constructed in accordance with the present invention, illustrating the manner of chip formation as the teeth move through the kerf.

As shown in Figure 1 the tips T will remove the bulk of the material since they are narrower than the kerf which is being cut. This bulk-removal chip will not be bound at its edges but will curl up freely in the gullet 3 and spring out radially as the tooth leaves the work. The material on the side faces of the kerf, as shown at $c$ in Figure 1, will be removed sharply and cleanly by the planing tooth 2' which follows in successive order after the series of bulk-removal teeth 2. The material removed by the planing teeth 2' is preferably limited to about 7.5 or less of the total chip loading so that the chips formed thereby will curl up in two unimpeded spirals from the side wall of the gullet 3', and the side faces of the kerf will be clean, sharp, and smooth. The present invention is not limited to the tooth arrangement shown and for some types of applications it is desirable to employ sets containing various multiples of "bulk-removal" teeth interspersed with "planer" or planing teeth, as they may be called, but in all cases there must be substantially less "planer" teeth than "bulk-removal" teeth.

It should be understood that although, for purposes of illustration, reference has been specifically made to circular cutters, the present invention can be equally well applied to straight saws, such as power hack saw blades, broaches, and the like, and that modifications in the form, construction, arrangement, and combination of the several parts of toothed cutters may be made and substituted for those herein shown and described without departing from the nature and principle of my invention.

Having thus described my invention, what I claim and desire to secure by Letters Patent is:

1. A circular cutter having a plurality of spaced teeth around its periphery, said teeth being arranged in groups, each group consisting of a plurality of successive teeth one of which is substantially lower in radial height and from 1.5% to 7.5% greater in transverse width than the preceding tooth in such group.

2. A circular cutter comprising a circular plate having a plurality of uniformly spaced teeth around its periphery, the gullets between each tooth being defined by a smooth continuous curve, all of said gullets having substantially the same profile, said teeth being arranged in groups, each group consisting of a high tooth and a low tooth, the high tooth having a transverse cutting edge across its outer end, said cutting edge being slightly wider than the thickness of the plate, said high tooth being tapered radially downwardly and inwardly toward the center of the cutter so as to be limited to cutting on its cutting edge, the low tooth being slightly wider than the cutting edge of the high tooth and being provided on its oppositely presented lateral faces with a dihedrally angled clearance face extending rearwardly and inwardly from side-cutting edges, said side-cutting edges conforming in profile shape to the gullet-defining curve and being disposed in planes parallel to and spaced outwardly from the planes of the side faces of the cutter plate so that the low tooth is limited to cutting on said side-cutting edges, said low teeth being not more than 7.5% wider than the high teeth so as to assume a small relative chip loading.

References Cited in the file of this patent

UNITED STATES PATENTS

| Number | Name | Date |
|---|---|---|
| 8,393 | Woolston | Sept. 30, 1851 |
| 543,608 | Beale | July 30, 1895 |
| 1,771,722 | Prentice | July 29, 1930 |
| 1,861,218 | Huther | May 31, 1932 |
| 2,071,618 | Ferrari et al. | Feb. 23, 1937 |
| 2,126,382 | Goff et al. | Aug. 9, 1938 |
| 2,356,159 | Hesslein | Aug. 22, 1944 |
| 2,528,226 | Hildebrant | Oct. 31, 1950 |

FOREIGN PATENTS

| Number | Country | Date |
|---|---|---|
| 426,498 | Great Britain | Apr. 4, 1935 |